(12) United States Patent
Ohtomo et al.

(10) Patent No.: US 6,687,038 B2
(45) Date of Patent: Feb. 3, 2004

(54) OPTICAL PULSE OBSERVING DEVICE

(75) Inventors: Fumio Ohtomo, Tokyo (JP); Masahiro Ohishi, Tokyo (JP)

(73) Assignee: Kabushiki Kaisha TOPCON (JP)

( * ) Notice: Subject to any disclaimer, the term of this patent is extended or adjusted under 35 U.S.C. 154(b) by 121 days.

(21) Appl. No.: 09/894,686

(22) Filed: Jun. 28, 2001

(65) Prior Publication Data

US 2002/0024712 A1 Feb. 28, 2002

(30) Foreign Application Priority Data

Jun. 30, 2000 (JP) .......................... 2000-200331

(51) Int. Cl.$^7$ .......................... G02B 26/00; G02F 1/07; G02F 1/1335
(52) U.S. Cl. .......................... 359/237; 359/264; 349/14
(58) Field of Search .......................... 359/237, 264, 359/240, 244, 245, 238, 320, 321, 326, 332; 389/8, 58, 70, 16; 349/14, 19

(56) References Cited

U.S. PATENT DOCUMENTS

| | | | | | |
|---|---|---|---|---|---|
| 4,698,668 A | * | 10/1987 | Milgram | .................... | 348/56 |
| 4,907,860 A | * | 3/1990 | Noble | .................... | 348/56 |
| 5,276,539 A | * | 1/1994 | Humphrey | .................... | 349/15 |
| 5,877,825 A | * | 3/1999 | Kotler | .................... | 349/14 |
| 6,097,450 A | * | 8/2000 | Humphrey | .................... | 349/13 |

* cited by examiner

Primary Examiner—Georgia Epps
Assistant Examiner—Alicia Harrington

(57) ABSTRACT

An optical pulse observing device enables the clear observation of indirect laser light of pulse laser light. The optical pulse observing device to be used by a user for observing pulse illumination light directly or indirectly, includes an optical shutter means that operates for alternate opening and closing in synchronism with periodic pulses of the pulse laser light so as to open only during the duration of pulses of the pulse laser light to pass pulse laser light and external light.

5 Claims, 4 Drawing Sheets

OPTICAL PULSE OBSERVING DEVICE

BACKGROUND OF THE INVENTION

The present invention relates to an optical pulse observing device and, more particularly, to an optical pulse observing device capable of permitting the clear, indirect observation of pulse laser light.

A laser beam has been used as a pointer and a level for a survey instrument because a laser beam expands scarcely and capable of highly rectilinear propagation. Helium-neon lasers, i.e., atomic gas lasers that emit a red light of 632.8 nm in wavelength were used as a light source of laser devices in earlier times. However, helium-neon lasers need a large oscillator and a high driving voltage of several thousands volts and are difficult to handle.

Recently, semiconductor lasers (hereinafter abbreviated to "LD") capable of emitting red light similar to that which is emitted by helium-neon lasers have been developed and helium-neon lasers have been gradually replaced by LDs. Since LDs are easy to handle and can be powered by a battery, LDs have become used on many survey instruments.

Since laser light is radiant energy, there is a limit to an output power of a laser to ensure the safety of the eye. The output power limits for lasers are specified in minute steps for those that emit continuous laser light and those that emit pulse laser light. Output powers exceeding a safety limit are classified strictly.

Visible lasers generally employed in survey instruments are included in those of class 2 that are not required to be used under the control of a safety manager. Upper limit output power for visible lasers is 1 mW in the class 2. Although a visible laser included in a rotary laser device is graded class 2, the output of the visible laser in 0.25 s for which eyes are closed matters because of the rotation and hence the output power of the visible laser may be slightly higher.

However, since the absolute value of the power of the visible laser is small, it is difficult to recognize the laser light emitted by the visible laser visually in the sunshine in the daytime and the distance of visibility is very short. Such a problem may be solved by intermittent emission of laser light to utilize the visual sensitivity of eye. Actually, the visual recognition of the laser light emitted by the visible laser in the sunshine is very difficult.

Although the visibility of green laser light brighter than red laser light is somewhat higher than that of red laser light, it is still difficult to visually recognize green laser light in the sunshine. Thus the use of the visible lasers is limited to a guide beam for interior finish work or tunnels.

SUMMARY OF THE INVENTION

It is an object of the present invention to provide an optical pulse observing device that enables the clear observation of indirect light of pulse laser light and is to be used by a person for observing direct or indirect light of pulse illuminating light.

The optical pulse observing device according to the present invention includes an optical shutter means that operates for alternate opening and closing in synchronism with the periodic pulses of pulse illuminating light so as to open only during the duration of pulses of the pulse illuminating light to pass pulse illuminating light and external light.

DETAILED DESCRIPTION OF THE PREFERRED EMBODIMENTS

Preferred embodiments of the present invention will be described with reference to the accompanying drawings.

Principle

The reason why laser light is visible inside the room and is invisible in the sunshine will be explained. A laser emits laser light of a fixed intensity and a large amount of external light is incident on the eye. Therefore, the laser light will be clearly visible even in the sunshine as well as inside the room if only the external light is intercepted.

If only the external light is intercepted to reduce the same by half, the amount of light incident on the eye is reduced by half. The opening of the pupil increases and the visual sensitivity of the eye increases as the amount of light incident on the eye decreases. If the intensity of the laser light is kept unchanged in this state, the laser light can be easily visually recognized in the sunshine as well as inside the room.

Although observation of the laser light with intercepting the external light is possible when the laser is continuously emitting laser light and the laser light is being passed through a filter. However an only shaded, monochromatic image is formed for the eye of a man at that time. Such a condition is dangerous for actual work To avoid such an undesirable condition, the laser emits pulse laser light and an optical shutter is operated for opening in synchronism with pulses of the pulse laser light. If pulse laser light having a duty factor of 50% or below is used and the optical shutter is opened in synchronism with the pulses of the pulse laser light, at least half the amount of the external light is intercepted. When the optical shutter is thus operated, the amount of light incident on the eye is greater than that of the external light that is incident on the eye when all the external light is intercepted and hence the lightness of the visual field does not decrease so much and the visibility of the pulse laser light increases. Since the upper limit output of the laser that emits pulse laser light may be higher than that of the laser that emits continuous laser light, the pulse laser light of an increased intensity can enhance the visual recognition of the laser light.

Embodiments

Figure 1:
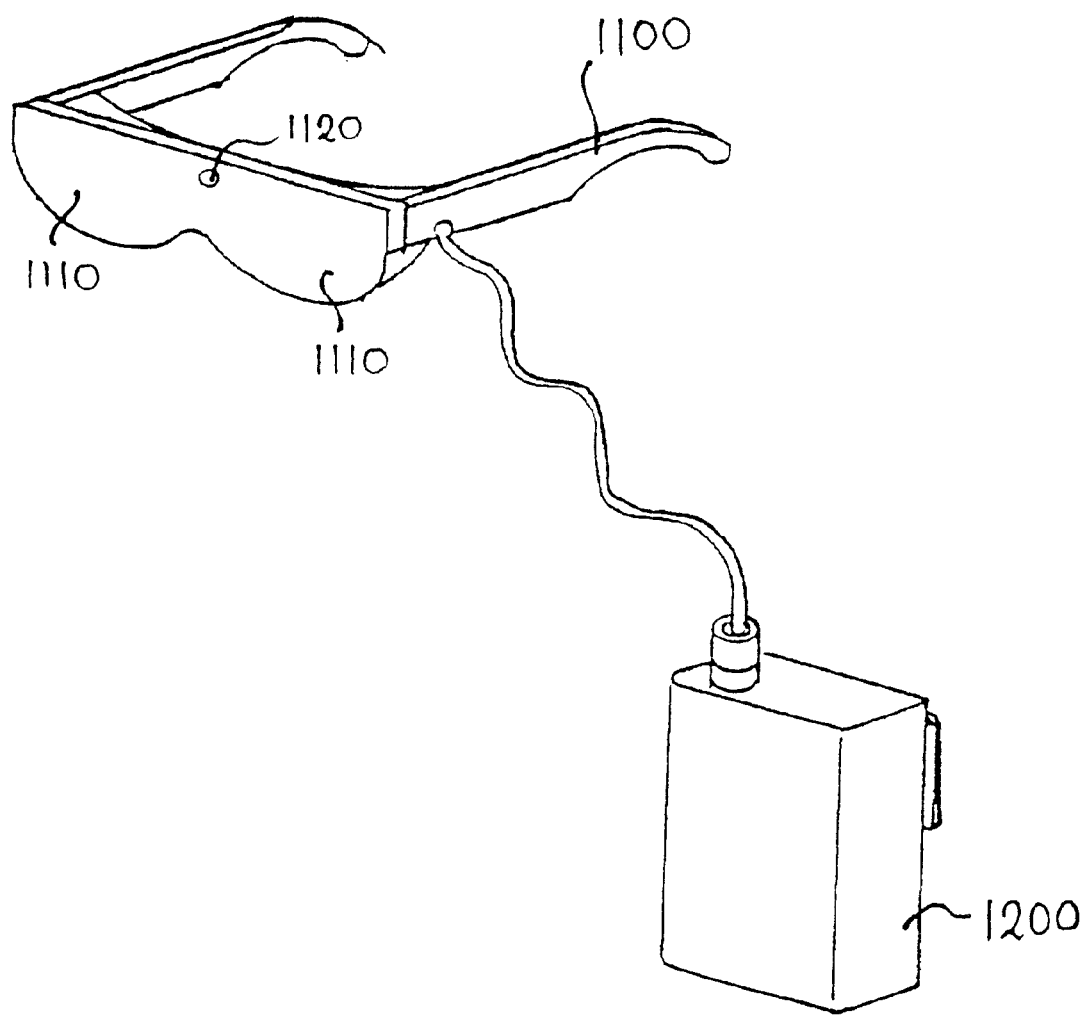
FIG. 1 is a perspective view of a pulse laser light observing device in a preferred embodiment according to the present invention.

Referring to FIG. 1, a pulse laser light observing device 1000 in a preferred embodiment according to the present invention is of a spectacles type. The pulse laser light observing device 1000 includes a main unit 1100 having the shape of a pair of spectacles, and a control unit 1200. The main unit 1100 has a front frame holding a pair of liquid crystal shutters 1110. A photodetector 1120 for detecting pulse laser light is placed on the front frame of the main unit 1100. The control unit 1200 controls the pair of liquid crystal shutters 1110 of the main unit 1100. The control unit 1200 can be worn on the user's waist.

Figure 2:
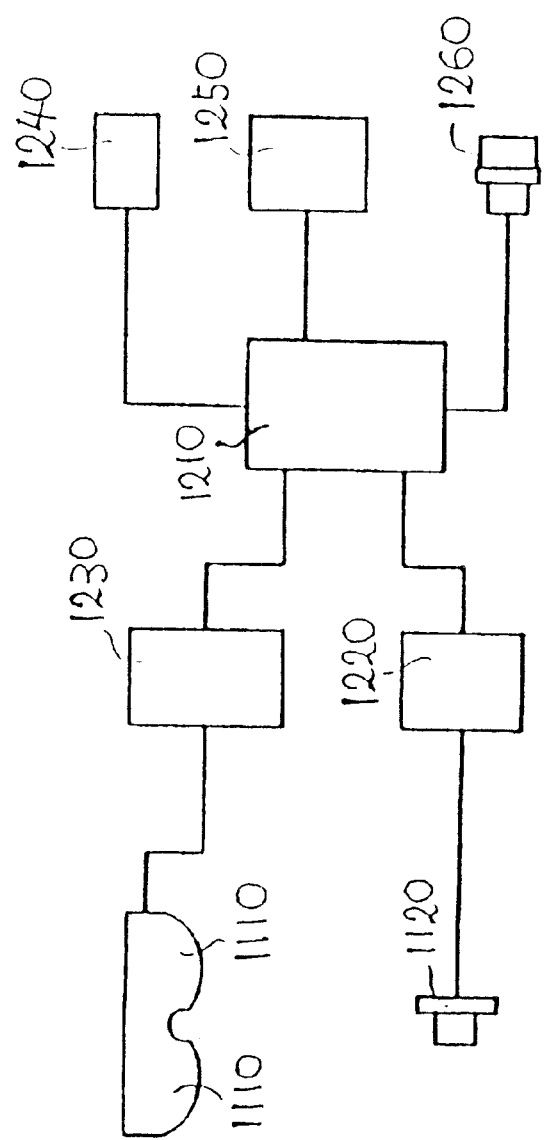
FIG. 2 is a block diagram of assistance in explaining the electric configuration of the pulse laser light observing device shown in FIG. 1.
Figure 3:
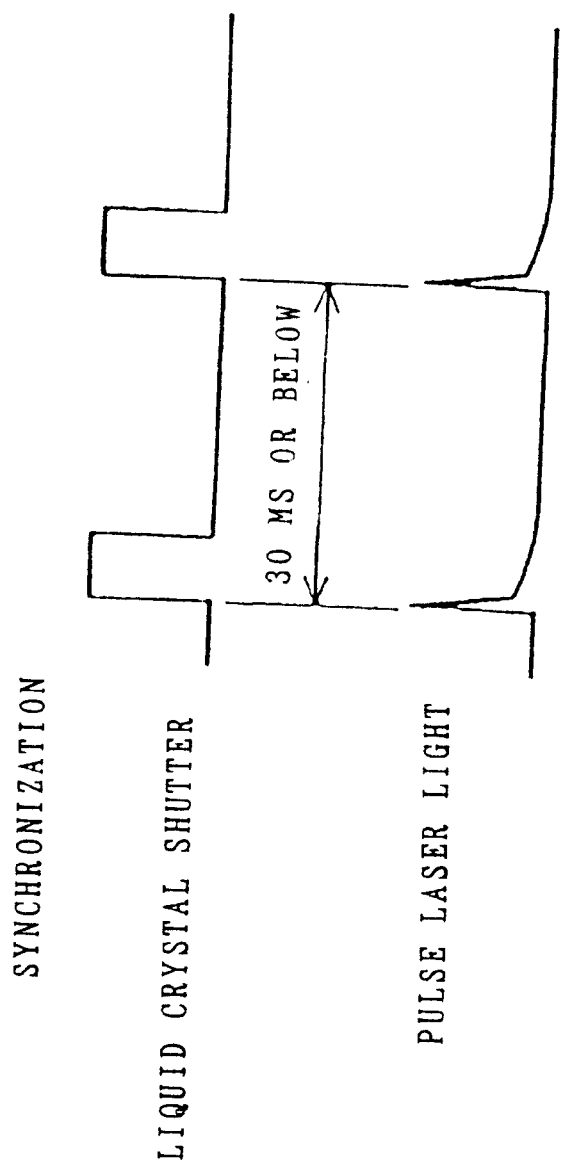
FIG. 3 is a diagram of assistance in explaining a synchronous pulse laser light observing device.

As shown in FIG. 2, the control unit 1200 includes a controller 1210, a photoelectric circuit 1220, a liquid crystal driver 1230, a display 1240, an input unit 1250 and an input terminal 1260 The control unit 1200 is provided with a power supply, such as a battery.

The controller 1210 controls the operation of the liquid crystal driver 1230 on the basis of a signal given thereto by a photodetector 1120 of the main unit 1100 to operate the liquid crystal shutters 1110 properly. The controller 1210 includes a CPU and controls all the operations of the pulse laser light observing device 1000.

The photoelectric circuit 1220 amplifies and shapes the waveform of an electric signal provided by the photodetector 1120. The liquid crystal driver 1230 drives the liquid crystal shutters 1110 according to a control signal provided by the controller 1210. The display 1240 displays data entered by operating the input unit 1250 for monitoring and other necessary data. An external device is able to enter data through the input terminal 1260 into the controller 1210. The main unit 1100 and the control unit 1200 of this embodiment are formed separately. Functions of the control unit 1200 may be incorporated into those of the main unit 1100.

A control method to be carried out by the control unit 1200 will be described hereinafter.

Synchronous Operation

The controller 1210 controls the liquid crystal shutters 1110 so that the liquid crystal shutters 1110 are operated for opening periodically in synchronism with periodic pulses of the pulse laser light for a time corresponding to the duration of the pulses of the pulse laser beam. The user enters data on the period of the pulses of the pulse laser light, the duration of the pulses of the pulse laser light and the like by operating the input unit 1250.

The photodetector 1120 detects the pulse laser light and gives a pulse laser light detection signal to the controller 1210. The controller 1210 compares the pulse laser light detection signal with a signal representing the periodic opening operation of the liquid crystal shutters 1110 and controls the liquid crystal shutters 1110 so that the phase of the opening operation of the liquid crystal shutters 1110 coincides with that of the pulse laser light and the opening operation of the liquid crystal shutters 1110 is synchronized with the pulses of the pulse laser light.

The liquid crystal shutters 1110 and the liquid crystal driver 1230 constitute an optical shutter device, i.e., an optical shutter means, that operates in synchronism with the pulses of the pulse laser light to pass the pulse laser light and the external light only during the duration of the pulses of the pulse laser light.

The respective periods of the pulses of the pulse laser light and the optical shutter device may be 30 ms or below. Ranges for the period and duration of the pulses of the pulse laser light may be determined beforehand, and the opening and closing operation of the liquid crystal shutters 1110 may be controlled so that the period of open states, the duration of open states and the phase of the open states of the liquid crystal shutters 1110 coincide automatically with the period, the duration and the phase of the pulses of the pulse laser light, respectively. The pulse laser light observing device 1000 may be provided with a synchronizing device for automatically synchronizing the opening operation of the optical shutter device with the pulses of the pulse laser light.

Asynchronous Operation

A control method in case of an asynchronous operation will be described hereinafter.

The eye of a man is unable to sense a flicker flickering at a frequency not lower than 30 Hz approximately and regards such a flicker as continuous light of a constant intensity. The eye of a man is able to sense a flicker flickering at a frequency below 30 Hz. A man feels that a flicker has a luminous intensity higher than that of stationary light having a luminous intensity equal to that of the flicker. Such a phenomenon is called "Bartley effect". The present invention uses Bartley effect. The relation of the period of the pulse of the pulse laser light and duration time of opening and closing the liquid crystal shutters 1110 in the case of asynchronous operation is shown in FIG. 4.

Figure 4:
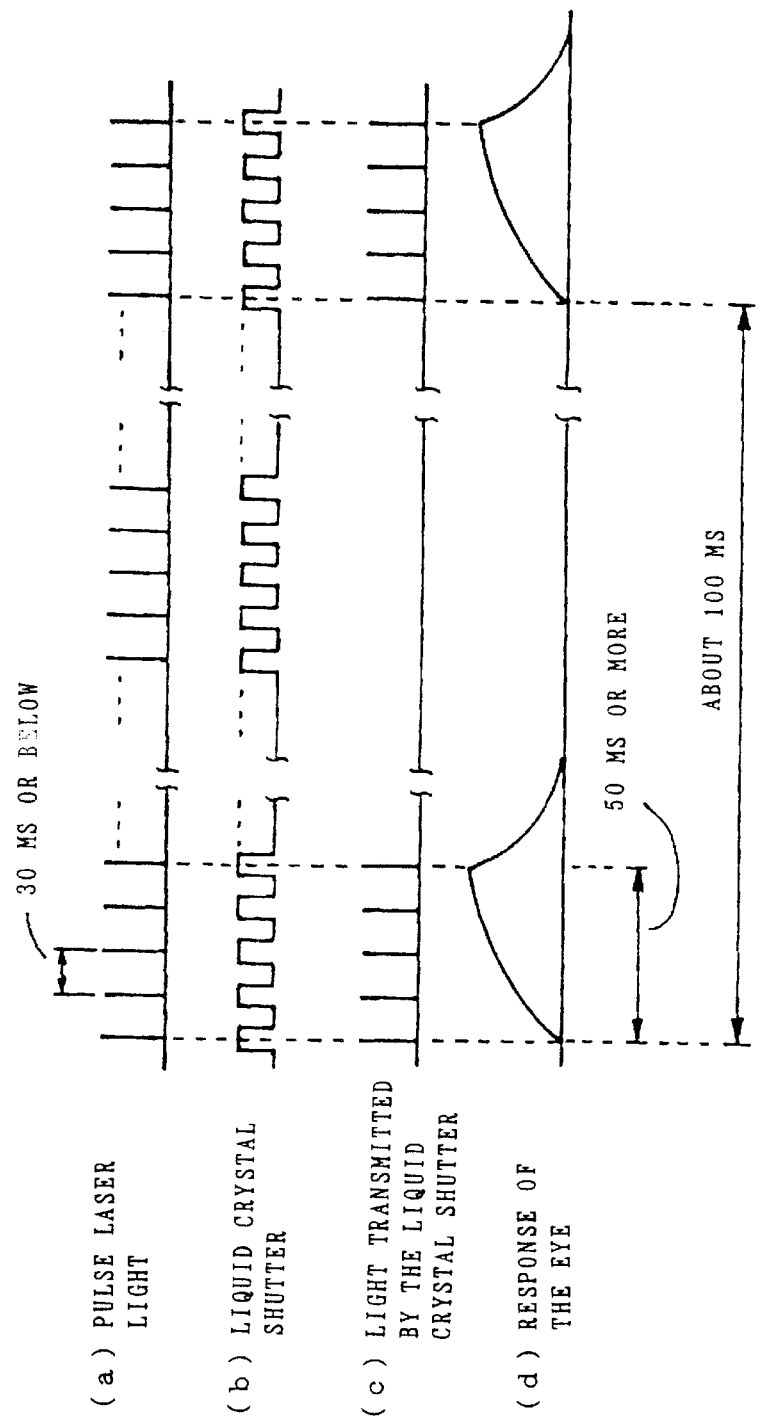
FIG. 4 is a diagram of assistance in explaining an asynchronous pulse laser light observing device.

Pulse laser light has pulses as shown in FIG. 4(*a*) and the liquid crystal shutters 1110 are opened and closed as shown in FIG. 4(*b*). FIG. 4(*c*) shows light pulses transmitted by the liquid crystal shutters 1110 and FIG. 4(*d*) show a mode of response of the eye to the pulse laser light transmitted by the liquid crystal shutters 1110.

The period of pulses of the pulse laser light is 30 ms or below. The liquid crystal shutters 1110 are opened and closed in timing slightly different from that of the pulses of the pulse laser light. As shown in FIG. 4, pulses of the pulse laser light coincide with the open state of the liquid crystal shutters 1110 for 50 ms and do not coincide with the open state of the liquid crystal shutters 1110 for the next 50 ms. Thus, the coincidence of the pulses of the pulse laser light and the open state of the liquid crystal shutters 1110 occurs at intervals of 100 ms.

The liquid crystal shutters 1110 transmit pulses of the pulse laser light emitted while the liquid crystal shutters 1110 are open and those emitted while the liquid crystal shutters are closed are not transmitted.

FIG. 4(*d*) show a mode of response of the eye to the pulse laser light transmitted by the liquid crystal shutters 1110 Since the eye of a man does not respond to a light pulse having a pulse width of 30 ms or below. Therefore, the observer feels that a light pulse having a pulse width of 50 ms is repeated at a period of 100 ms as low frequency flickering.

On the other hand external light has a constant intensity and hence has no relation with synchronism between the opening operation of the liquid crystal shutters 1110 and the pulses of the pulse laser light. The liquid crystal shutters 1110 transmit external light only while the liquid crystal shutters 1110 are in an open state. Since the external light is interrupted at a frequency of 30 Hz or above, the eye is unable to sense the flicker of external light. Thus, the eye receives external light of a certain intensity reduced according to the duty factor of the liquid crystal shutters 1110.

Thus, the pulse laser light flickering at 10 Hz that makes Bartley effect effective can be clearly recognized for the external light reduced to the certain intensity.

In the second embodiment, only the frequency and duration of opening of the liquid crystal shutters 1110 are adjusted to those of the pulses of the pulse laser light, respectively, and the phase of the opening operation of the liquid crystal shutters 1110 does not need to coincide with that of the pulse laser beam, which simplifies the circuit configuration of the control unit 1200.

The period of pulses of the pulse laser light, the time for which the open state of the liquid crystal shutters 1110 coincides with the pulses of the pulse laser light and the frequency of the period of coincidence are not limited to those shown in FIG. 4 and may be changed properly provided that the same effect can be expected.

Changing the frequency of operation of the liquid crystal shutters 1110 can change the period of flicker that can be sensed by the eye. The user is able to enter a desired frequency of the opening operation of the liquid crystal shutters 1110 for adjustment by operating the input unit 1250.

When the frequency of the pulses of the pulse laser light is known and the period of flicker is fixed, the opening frequency and the period of opening and closing operation of the liquid crystal shutters 1110 can be fixed and hence any adjusting operation is not necessary. The liquid crystal shutters 1110 and the liquid crystal driver 1230 constitute an optical shutter device, i.e., an optical shutter means, that operates asynchronously with the pulses of the pulse laser light to pass the pulse laser light and the external light only during the duration of the pulses of the pulse laser light. The pulse laser light is the illuminating light.

As apparent from the foregoing description, the optical pulse observing device to be used by a user for observing the pulse illumination light directly or indirectly according to the present invention includes the optical shutter means that operates for alternate opening and closing in synchronism with the periodic pulses of pulse illuminating light so as to open only during the duration of pulses of the pulse illuminating light to pass pulse illuminating light and external light. Therefore, the device has excellent effect that the pulse laser light can be clearly recognized even in a light place.

What is claimed is:

1. An optical pulse observing device to be used by a user to observe pulse illuminating light directly or indirectly, comprising an optical shutter means that operates for alternate opening and closing in synchronism with periodic pulses of the pulse illuminating light at a frequency different from that of the periodic pulses of the pulse illuminating light so as to open to pass pulse illuminating light and external light.

2. The optical pulse observing device according to claim 1, wherein the respective periods of pulses of the pulse laser light and the optical shutter device are 30 ms or below.

3. The optical pulse observing device according to claim 1, wherein a period in which the pulse of the pulse illuminating light coincides with an open state of the optical shutter means is repeated at a frequency that makes Bartley effect effective.

4. The optical pulse observing device according to claim 1 further comprising a tuning means for tuning period of an open state of the optical shutter means to that of the pulses of the pulse illuminating light.

5. The optical pulse observing device according to claim 1, wherein the optical pulse observing device is formed in a shape of a pair of spectacles to be used by a user for observing the pulse illuminating light indirectly.

* * * * *